US007132081B2

(12) United States Patent
Diefenbach et al.

(10) Patent No.: US 7,132,081 B2
(45) Date of Patent: Nov. 7, 2006

(54) DEVICE USED IN PARALLEL MICROSYNTHESIS

(75) Inventors: Beate Diefenbach, Munich (DE); Holger Deppe, Frankfurt (DE); Hanns Wurziger, Darmstadt (DE); Alexander Gross, Babenhausen (DE); Gregor Schlingloff, Kleinberau (DE); Andreas Schober, Darmstadt (DE); Dirk Tomandl, Ober-Ramstadt (DE)

(73) Assignee: Nanomics Technologies GmbH, Ilmenau (DE)

( * ) Notice: Subject to any disclaimer, the term of this patent is extended or adjusted under 35 U.S.C. 154(b) by 419 days.

(21) Appl. No.: 10/296,056
(22) PCT Filed: Apr. 27, 2001
(86) PCT No.: PCT/EP01/04758

§ 371 (c)(1),
(2), (4) Date: Nov. 21, 2002

(87) PCT Pub. No.: WO01/89680

PCT Pub. Date: Nov. 29, 2001

(65) Prior Publication Data

US 2003/0138360 A1    Jul. 24, 2003

(30) Foreign Application Priority Data

May 23, 2000    (DE) ................................. 100 25 698

(51) Int. Cl.
B01L 3/00         (2006.01)
(52) U.S. Cl. ...................................... 422/102; 422/104
(58) Field of Classification Search .................. 422/99, 422/101, 102, 104
See application file for complete search history.

(56) References Cited

U.S. PATENT DOCUMENTS

| 4,857,409 A | * | 8/1989 | Hazelton et al. ............. 428/494 |
| 6,054,100 A | * | 4/2000 | Stanchfield et al. ......... 422/102 |

FOREIGN PATENT DOCUMENTS

| DE | 19843655 | 3/2000 |
| EP | 0299741 | 1/1989 |
| WO | WO 9822219 | 5/1998 |

* cited by examiner

*Primary Examiner*—Jill Warden
*Assistant Examiner*—Natalia Levkovich
(74) *Attorney, Agent, or Firm*—Millen, White, Zelano, Branigan, P.C.

(57) ABSTRACT

Microwells, which are open on both sides and are arranged two-dimensionally in a microwell matrix (4), are hermetically closed by pressure on both sides using plugs (6) covered with a sealing sheet (11). A layer of elastic material (9), which is arranged between the plug (6) and the sealing sheet (11), guarantees uniform pressure on all the microwells of a microwell matrix (4) which is loosely held by a frame structure (1). Continuous peripheral elevations (2), which protrude in both directions at right angles to the plane of the microwell matrix (4), ensure that the deformable thin layer of elastic material (9) does not escape sideways between the plug (6) and the microwell matrix (4) during the pressing process. A plurality of microwell matrices (4) are held simultaneously by the frame structure (1) and are hermetically closed by a corresponding number of allocated plugs (6), which are fastened to a base plate (7) and a cover plate (8), respectively.

24 Claims, 2 Drawing Sheets

Figure 3:
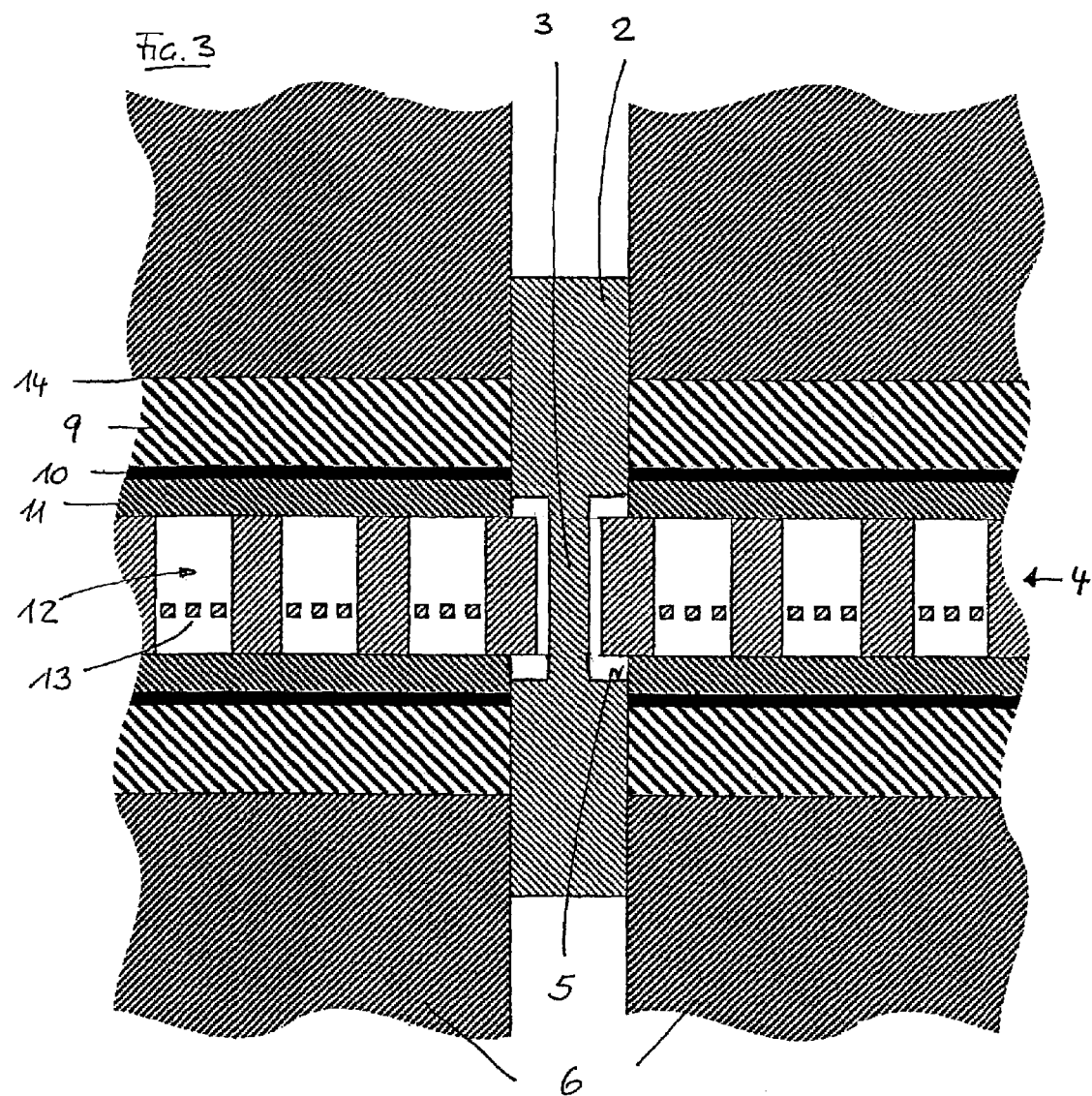

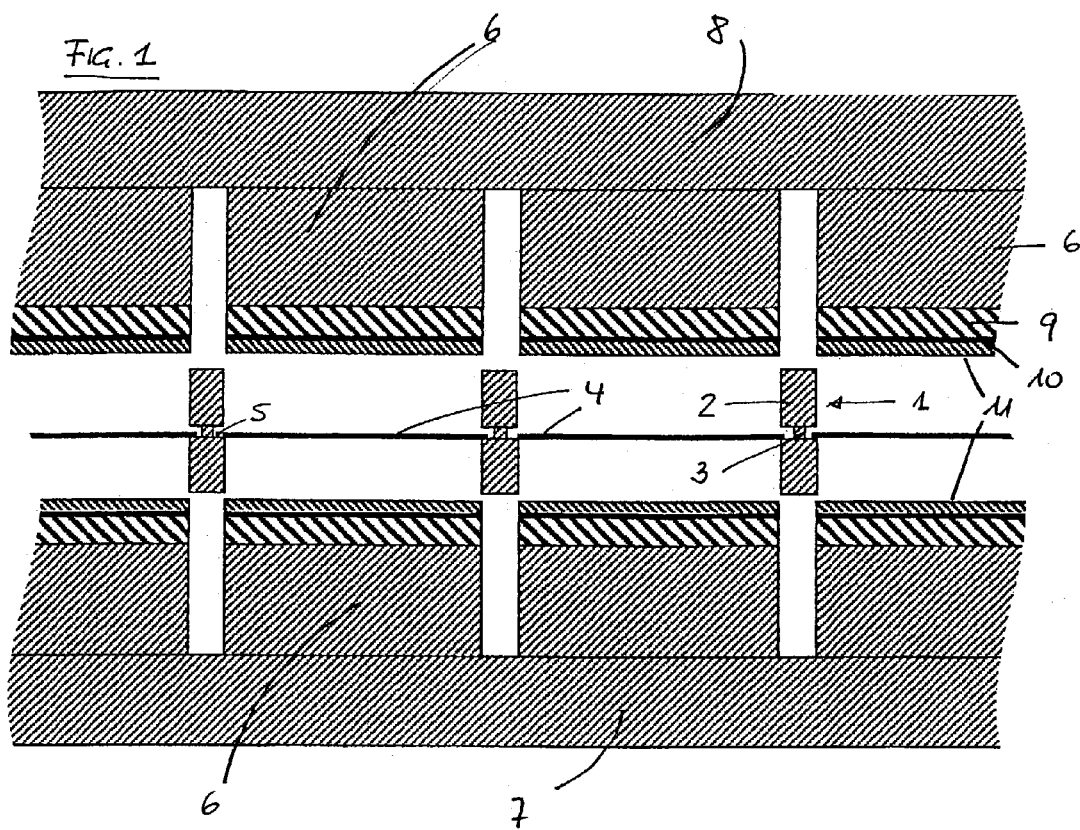
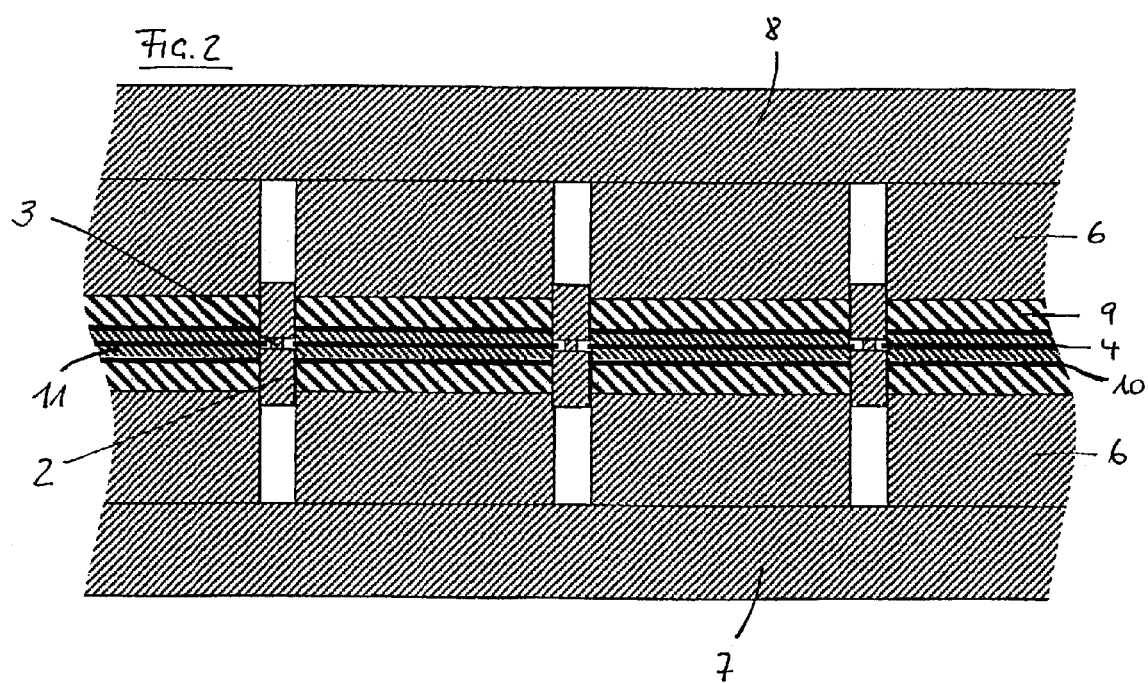

DEVICE USED IN PARALLEL MICROSYNTHESIS

The invention relates to a device for carrying out a plurality of microsyntheses in parallel.

Both in the scope of research and development work, and when carrying out routine analysis, the sample turnover requirements of the chemical, biological and pharmaceutical industries are constantly increasing. In order to meet this need economically and efficiently, attempts are being made to carry out ever more working steps simultaneously for as many samples as possible, and to minimize the respective sample volume needed for this.

It has become common practice to combine a plurality of small reaction containers, arranged in a matrix, to form reaction units. The individual reaction containers, in the simplest case a test tube, have a typical capacity in the range of from milliliters to, in rare cases, a few microliters. This miniaturization not only permits ever greater parallel processing of individual working steps, but also reduces routine costs for obtaining and disposing of the chemical substances, biological materials and solvents which are used.

A constantly rising sample turnover requires increasing automation of as many working steps as possible. Nowadays, it is already customary for constantly recurring working steps, for example the filling or emptying of individual reaction containers, to be carried out in automated fashion. If a plurality of individual reaction containers are combined to form a reaction unit, it is not only necessary to guarantee the simplest possible access to each individual reaction container, but the configuration of the overall reaction unit must also permit automated handling during the process.

The influence of the evaporation effects which may occur becomes commensurately more problematic when smaller amounts of the chemical substances and solvents used are chosen. Hermetic closure of the individual reaction containers during a reaction is therefore absolutely necessary in order, on the one hand, to minimize evaporation effects and, on the other, to prevent uncontrolled escape of reaction solutions during a reaction.

As the reaction volume of an individual reaction container is reduced, the required design outlay for hermetic closure then increases. For relatively large reaction containers and corresponding amounts of reaction solution, a cover pressed lightly onto the individual openings is sufficient. If a plurality of reaction containers having a respective capacity in the microliter range are combined, then the individual reaction containers are not closed hermetically enough by a lid pressed on with spring force, even if a sealing sheet is inserted between the lid and the openings of the individual reaction containers. Contamination of neighbouring reaction containers by escaping reaction solutions is only prevented by providing a sufficient intermediate space between the individual reaction containers.

Even more highly miniaturized reaction units consist of a wafer in which a large number of individual cavities are arranged in a matrix. Such a microwell matrix can, for example, be produced from a silicon wafer by controlled etching processes. The capacity of the individual cavities, which are referred to as microwells, may be much less than one microliter. Hermetic closure of the microwells is not possible using known methods. Because of the small dimensions of the individual microwells, extremely strong capillary forces are encountered. The evaporation, uncontrolled escape or crossover of even minute amounts of reaction solutions during a reaction inevitably leads to vitiated results of any subsequently conducted quantitative evaluation of the reaction. Known closure mechanisms are not sufficient in the case of a microwell matrix having such small dimensions.

It is therefore an object of the invention to configure a device for carrying out a plurality of microsyntheses in parallel in a microwell matrix in such a way that the individual microwells of the microwell matrix can be hermetically closed. The closing of the microwells before a reaction, and their opening after a reaction should be automatable if possible, so that the overall process can be carried out economically and efficiently.

The inventive solution to this object is based on a device having a frame structure which accommodates at least one microwell matrix and has continuous peripheral elevations protruding vertically beyond the microwell matrix in both directions, having a base plate and a cover plate and, firmly attached to the base plate and cover plate, respectively, plugs which can be moved so as to fill the intermediate space bounded by the elevations of the frame structure with a tight fit, wherein a layer of elastic material and a sealing sheet are in each case fastened to the side of the plug facing the microwell matrix.

A very high pressure is required in order to guarantee hermetic closure of each individual microwell in spite of the extremely strong capillary forces. Because of the small layer thickness of the microwell matrix, it would be virtually impossible to distribute the pressure of a substantially inelastic common cover uniformly over all the microwells. Even minor positional discrepancies of either the microwell matrix or the plugs lead to a fairly significant pressure gradient, which in the worst case can cause destruction of the relatively fragile microwell matrix. Without great design outlay, this problem is resolved by the insertion of a preferably thin layer of elastic material between the plug and the sealing sheet. The thin layer of elastic material compensates, by a corresponding deformation, for non-plane-parallel pressing of the plug onto the microwell matrix so that the sealing sheet is pressed uniformly onto each microwell.

Under a pressure such as that required for hermetic closure of all the microwells, the thin layer of elastic material would at least partially escape sideways. Sufficiently strong and uniform pressing of the sealing sheet onto the microwells would then no longer be guaranteed. There is also a risk that the thin layer of elastic material might, at least locally, be fully displaced by pressure on the plug, so that the inelastic plug would then press directly on the sealing sheet or the microwell matrix. Since the microwell matrix is held by a frame structure which has elevations protruding in both directions and continuously enclosing the microwell matrix, the compressed thin layer of elastic material is prevented from escaping sideways by the elevations which enclose the plug with a tight fit. The microwells are closed and opened, respectively, by applying and releasing pressure on both sides to/from the base plate and the cover plate. Furthermore, no possibly complex closure mechanisms are needed so that automation of these processes can be implemented with very simple means.

Preferably, a plurality of microwell matrices are held simultaneously by the frame structure, and a corresponding number of allocated plugs are fastened to the base plate and the cover plate, respectively. Even if the number of microwells is large, the microwell matrix has only extremely small dimensions, so that the simultaneous use of a plurality of microwell matrices is possible and economically viable. For reasons relating to manufacturing technology, an individual microwell matrix cannot be produced with an arbitrarily large size. Having a plurality of small plugs, which are enclosed with a tight fit by the elevations of the frame structure, is also advantageous with a view to the controlled application of a uniform pressure onto all the individual microwells.

According to an advantageous refinement of the inventive concept, a vapour barrier is fitted between the layer of elastic material and the sealing sheet for each plug. When the pressure is sufficient, the sealing sheet pressed onto the openings of the microwells effectively prevents liquids from escaping out of the microwell. However, the materials normally used as a sealing sheet do not fully prevent the escape or slow diffusion of gaseous reaction-solution vapours. The vapours possibly escaping from the reaction solutions can negatively affect the properties of the layer of elastic material, especially the elasticity of this layer, and this can be prevented by a vapour barrier which is additionally fitted. This vapour barrier may itself also consist of a thin layer or a sheet.

In accordance with one refinement of the inventive concept, the base plate and/or the cover plate have devices for controlling the temperature. In many cases, faster and more efficient reaction of the chemical substances involved is achieved by an elevated temperature during the reaction sequence. Via the base plate and/or the cover plate, a temperature different from the ambient temperature can be set for the entire device, including the microwell matrix. By virtue of the readily accessible and sufficiently large base plate or cover plate, respectively, it is possible to provide a temperature control facility having a simple design.

In accordance with an advantageous embodiment of the inventive concept, one or more plugs have devices for controlling the temperature. It is precisely in the case of highly temperature-dependent working steps that more direct temperature control of the microwells may be desirable. When they are engaged, the plugs bear extensively on the microwell matrix, so that accurate temperature control can be carried out.

Further advantageous refinements of the inventive concept are the subject-matter of other dependent claims.

Exemplary embodiments of the invention will be explained in more detail below and are represented in the drawing, in which:

FIG. 1 shows a section through a plurality of microwell matrices which are held by a frame structure, with the plugs retracted, FIG. 2 shows a section through the exemplary embodiment shown in FIG. 1, with the plugs engaged, and FIG. 3 shows an enlarged detail of FIG. 2.

The device represented in FIG. 1 in the opened state has a frame structure 1 with a plurality of wall-like elevations 2, which protrude in both directions at right angles to the plane of the frame structure 1. Each pair of directly opposite wall-like elevations 2 is connected together via a constriction 3. In each case, a microwell matrix 4 rests on a circumferential support surface 5 formed by a plurality of neighbouring elevations 2 connected via constrictions 3. The individual microwell matrices 4 are in this case seated loosely and can move slightly in all directions. Above and below each microwell matrix 4, there is a plug 6 which is respectively fastened to a base plate 7 or cover plate 8 common to all the plugs 6. On the side facing the microwell matrix 4, a thin layer of elastic material 9, a vapour barrier 10 designed as a sheet, and a sealing sheet 11 are fitted to each plug 6. The respective mutual spacing of the individual plugs 6 is selected in such a way that each plug 6 fills the intermediate space bounded by the elevations 2 of the frame structure 1 with a tight fit.

FIG. 2 shows a section through the device when the openings of all the microwell matrices 4 are hermetically closed by pressure from both sides on the base plate 7 and the cover plate 8, respectively. In each case, a plug 6 then extensively presses the sealing sheet 11, respectively from above and below, onto the openings of the microwell matrix 4. The thin layer of elastic material 9 ensures that, even if the microwell matrix 4 is not aligned exactly parallel with the plugs 6, or the plugs 6 are not aligned exactly parallel with one another, a uniform application pressure of the sealing sheet 11 on all the microwells of the microwell matrix 4 is guaranteed.

Owing to the loose and slightly mobile seating of the microwell matrix 4 on the circumferential support surface 5, compensation for any possible differing application pressure of the two plugs 6 is possible, by changing the position of the microwell matrix 4, in the region defined by the dimensions of the constriction 3.

The thin layer of elastic material 9, which deforms under pressure, is prevented from squeezing out sideways by the elevations 2 which enclose the plugs 6 with a tight fit. Permanent deformation of the thin layers or sheets fitted to the plug 6, especially of the thin layer of elastic material 9, is prevented in a large pressure range by the elevations 2 continuously enclosing the plug 6, so that the described device can be used unchanged through a plurality of working cycles.

A special embodiment of the microwell matrix 4 is represented diagrammatically in the detail of FIG. 2 which is represented on an enlarged scale in FIG. 3. Each microwell 12 is in this case designed as an uninterrupted hole in the microwell matrix 4, and has a mesh bottom 13. The sealing sheet 11 is pressed onto the surface of the microwell matrix 4 by the allocated plug 6, and thereby closes the microwells 12.

Depending on the application, a thin metal sheet 14 may be arranged between each plug 6 and the thin layer of elastic material 9 fastened thereto.

The base plate 7 and the cover plate 8 may be firmly connectable by screw devices (not shown). By means of this, especially during reaction sequences which last a long time, constant pressure of the plugs 6 on the microwell matrices 4 can be achieved without eat design outlay.

The invention claimed is:

1. A device for carrying out a plurality of microsyntheses in parallel, said device comprising:
    a frame structure (1) which includes at least one microwell matrix (4), said frame structure having continuous peripheral elevations (2) protruding vertically beyond the microwell matrix (4) in both directions,
    a base plate (7) and a cover plate (8) and, firmly attached to the base plate (7) and cover plate (8), respectively, plugs (6) which can be moved so as to fill space bounded by the elevations (2) of the frame structure (1) with a tight fit, and
    a layer of elastic material (9) and a sealing sheet (11) fastened, in each case, to the side of the plug facing the microwell matrix (4).

2. A device according to claim 1, wherein a plurality of microwell matrices (4) are held simultaneously by the frame structure (1), and a corresponding number of allocated plugs (6) are fastened to the base plate (7) and the cover plate (8), respectively.

3. A device according to claim 1, further comprising, for each plug (6), a vapor barrier (10) fitted between the layer of elastic material (9) and the sealing sheet (11).

4. A device according to claim 1, further comprising a metal sheet (14) arranged between each plug (6) and the layer of elastic material (9) fastened thereto.

5. A device according to claim 1, wherein said base plate (7), cover plate (8), or both, have devices for controlling the temperature.

6. A device according to claim 1, wherein one or more of said plugs (6) have devices for controlling the temperature.

7. A device according to claim 1, wherein said base plate (7) and said cover plate (8) can be firmly connected by screw devices.

8. A device according to claim 1, wherein said elevations 2 are wall-like, protruding in both directions from the plane of said frame structure 1.

9. A device according to claim 8, wherein said elevations are arranged in pairs that protrude in directly opposite directions from the plane of the frame structure, and each pair of wall-like elevations 2 is connected together via a constriction 3.

10. A device according to claim 9, wherein said microwell matrix 4 rests on a circumferential support surface 5 formed by a plurality of neighbouring pairs of elevations 2 connected via constrictions 3.

11. A device according to claim 2, wherein said elevations 2, are wall-like protruding in both directions from the plane of said frame structure 1.

12. A device according to claim 11, wherein said elevations are arranged in pairs that protrude in directly opposite directions from the plane of the frame structure, and each pair of wall-like elevations 2 is connected together via a constriction 3.

13. A device according to claim 8, wherein each of said microwell matrices 4 rests on a circumferential support surface 5 formed by a plurality of neighbouring pairs of elevations 2 connected via constrictions 3.

14. A device according to claim 1, wherein each microwell 12 of said microwell matrix 4 has a volume in the mircoliter range.

15. A device according to claim 1, wherein each microwell 12 of said microwell matrix 4 has a mesh bottom 13.

16. A device according to claim 1, wherein said layer of elastic material (9) is positioned between said plugs and said sealing sheet (11).

17. A device according to claim 1, further comprising, for each plug (6), a vapor barrier (10) fitted between the layer of elastic material (9) and the sealing sheet (11).

18. A device according to claim 17, wherein said elevations 2 are wall-like, protruding in both directions from the plane of said frame structure 1.

19. A device according to claim 18, wherein said elevations are arranged in pairs that protrude in directly opposite directions from the plane of the frame structure, and each pair of wall-like elevations 2 is connected together via a constriction 3.

20. A device according to claim 19, wherein said microwell matrix 4 rests on a circumferential support surface 5 formed by a plurality of neighbouring pairs of elevations 2 connected via constrictions 3.

21. A device according to claim 20, wherein a plurality of microwell matrices (4) are held simultaneously by the frame structure (1), and a corresponding number of allocated plugs (6) are fastened to the base plate (7) and the cover plate (8), respectively.

22. A device according to claim 21, wherein each microwell 12 of said microwell matrix 4 has a volume in the mircoliter range.

23. A device according to claim 14, wherein each microwell 12 of said microwell matrix 4 has a volume of less than one microliter.

24. A device according to claim 22, wherein each microwell 12 of said microwell matrix 4 has a volume of less than one microliter.

\* \* \* \* \*